US012725917B2

(12) United States Patent
Biggins et al.

(10) Patent No.: US 12,725,917 B2
(45) Date of Patent: Sep. 1, 2026

(54) ISOLATION ELEMENT FOR DIVERSITY ANTENNAS

(71) Applicant: Google LLC, Mountain View, CA (US)

(72) Inventors: Paul Biggins, San Jose, CA (US); Huanyu Chen, Freemont, CA (US); Lauren Francine Chanen, Phoenix, AZ (US)

(73) Assignee: Google LLC, Mountain View, CA (US)

( * ) Notice: Subject to any disclaimer, the term of this patent is extended or adjusted under 35 U.S.C. 154(b) by 440 days.

(21) Appl. No.: 18/258,741

(22) PCT Filed: Sep. 12, 2022

(86) PCT No.: PCT/US2022/076281
§ 371 (c)(1),
(2) Date: Jun. 21, 2023

(87) PCT Pub. No.: WO2024/058799
PCT Pub. Date: Mar. 21, 2024

(65) Prior Publication Data
US 2024/0380105 A1 Nov. 14, 2024

(51) Int. Cl.
*H01Q 1/48* (2006.01)
*H01Q 1/52* (2006.01)
*H01Q 9/00* (2006.01)

(52) U.S. Cl.
CPC ............... *H01Q 1/521* (2013.01); *H01Q 1/48* (2013.01); *H01Q 9/00* (2013.01)

(58) Field of Classification Search
CPC .......... H01Q 1/48; H01Q 1/243; H01Q 1/521; H01Q 1/526; H01Q 1/2283; H01Q 9/00; H01Q 9/26; H01Q 9/0407
See application file for complete search history.

(56) References Cited

U.S. PATENT DOCUMENTS

| | | | | |
|---|---|---|---|---|
| 10,476,136 B2 * | 11/2019 | Mow | ........................ | H01Q 1/48 |
| 2012/0050114 A1 * | 3/2012 | Li | .......................... | H01Q 1/243 343/702 |

(Continued)

FOREIGN PATENT DOCUMENTS

| | | |
|---|---|---|
| EP | 2565983 | 3/2013 |
| EP | 2610964 | 7/2013 |
| TW | I533510 B | 5/2016 |

OTHER PUBLICATIONS

"International Search Report and Written Opinion", Application No. PCT/US2022/076281, Apr. 18, 2023, 10 pages.

(Continued)

*Primary Examiner* — Tung X Le
(74) *Attorney, Agent, or Firm* — Colby Nipper PLLC

(57) ABSTRACT

This document describes apparatus, devices, and methods for providing an isolation element for diversity antennas. The systems and techniques use supporting circuitry, such as wiring connectors, in a transmission device that uses diversity antennas to present a conductor connected to electrical ground to receive a portion of a transmission signal generated by at least one of the antennas to couple the signal to ground. In this manner, the isolation element helps to prevent signals from the diversity antennas from merging and thereby supports the diversity antennas' capability of successfully transmitting a signal when an obstacle may impede the signal transmitted by one of the antennas.

20 Claims, 13 Drawing Sheets

(56) References Cited

U.S. PATENT DOCUMENTS

| | | | | |
|---|---|---|---|---|
| 2019/0103653 | A1* | 4/2019 | Jeong | H01Q 1/243 |
| 2019/0229413 | A1* | 7/2019 | Jong | H01Q 1/523 |
| 2021/0151871 | A1 | 5/2021 | Lyu | |
| 2021/0376493 | A1* | 12/2021 | Shah | H01Q 1/38 |
| 2022/0158327 | A1* | 5/2022 | An | H01Q 23/00 |

OTHER PUBLICATIONS

"Foreign Office Action", TW Application No. 112126140, Oct. 8, 2025, 7 pages.

* cited by examiner

ISOLATION ELEMENT FOR DIVERSITY ANTENNAS

RELATED APPLICATION(S)

This application is a national stage entry of International Application No. PCT/US2022/076281, filed Sep. 12, 2022, the disclosure of which is incorporated herein by reference in its entirety.

Background

Wireless network communication devices that transmit data, such as Wi-Fi routers, commonly employ more than one antenna to improve signal coverage. Short wavelength signals, such as those used in common 2.4 GHz or 5.0 GHz signals, are on the order of 12.5 cm to 6 cm. Thus, multiple antennas separated by distances of even a short distance can significantly affect the radiation patterns of those antennas and, in turn, facilitate better communications with stationary or mobile devices through the differing radiation patterns of the antennas. However, when multiple antennas are placed within close proximity of one another, signal radiation matters transmitted by the antennas may merge or couple into a single pattern and thus undermine the value of including multiple antennas.

SUMMARY

This document describes apparatus, devices, and methods for providing an isolation element for diversity antennas. The systems and techniques use supporting circuitry, such as wiring connectors, in a (transmission device) that uses separate diversity antennas to present a conductor connected to electrical ground to receive a portion of a transmission signal generated by at least one of the antennas to couple the signal to ground. In this manner, the conductor forms an isolation element that reduces interference between signals generated by the diversity antennas and thereby supports the diversity antennas' capability of successfully transmitting a signal when an obstacle may impede the signal transmitted by one of the antennas.

For example, an apparatus is described that includes supporting circuitry configured to perform non-transmission functions in a device including transmission circuitry coupled with a plurality of antennas configured to transmit a transmission signal. A conductor incorporated within the supporting circuitry and configured to be coupled to an electrical ground is configured to receive and ground a portion of the transmission signal from at least one of the antennas. In example embodiments, the conductor may be part of a wiring connector of the supporting circuitry.

The isolation element formed by the conductor may exist separately from the transmission circuitry including its antennas (and any interconnecting wiring). In example embodiment, the conductor may be included in a wiring connector and may have a cross-section that is wider than a cross-section of any other signal conductor included in the wiring connector.

Also described herein are devices that include an isolation element and methods for providing an isolation element in a device that includes transmission circuitry and supporting circuitry. A device described herein may comprise transmission circuitry configured to transmit a transmission signal, a plurality of antennas coupled with the transmission circuitry and a proposed apparatus. Such apparatus may then include supporting circuitry configured to perform non-transmission functions within the device and a conductor configured to receive and ground a portion of a transmission signal from the plurality antennas (thereby forming an isolation element reducing interference between the signals generated by the separate antennas).

Methods for using supporting circuitry, such as a wiring connector, to provide an isolation element are also described.

In example embodiments, the conductor (forming an isolation element for the antennas) is configured to be arranged in a housing of the device. The housing of the device may comprise first and second housing portions, in particular a first housing and a second housing fixed to one another. For example, in cases where the conductor is part of a wiring connector, the conductor may connect a first section of the supporting circuitry (including at least one first electronic component of the supporting circuitry) arranged in the first housing portion to a second section of the supporting circuitry (including at least one second component of the supporting circuitry) arranged in the second housing portion. When the second housing is joined with the first housing in assembling the device, the wiring connector is configured to be positioned, with the conductor forming the isolation element, near the antennas (i.e., within a predetermined distance range less than a threshold/maximum distance from each one of the antennas, such as within a distance equivalent to a quarter-wavelength of the transmission signal).

Furthermore, the proposed solution also relates to a use of a wiring connector of a supporting circuitry having a conductor within a device as an isolation element for a plurality of antennas of a transmission circuitry. The transmission circuitry may thus be separated from the supporting circuitry in the device but the wiring connector of the supporting circuitry is used for improving transmission performance of the antennas of the transmission circuitry by reducing interference between the signals generated by the separate antennas.

This summary is provided to introduce simplified concepts of an isolation element for diversity antennas, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

This document describes apparatuses and techniques for implementing an isolation element for diversity antennas with reference to the following drawings. The same numbers are used throughout the drawings to reference like features and components.

DETAILED DESCRIPTION

Overview

Figure 1:
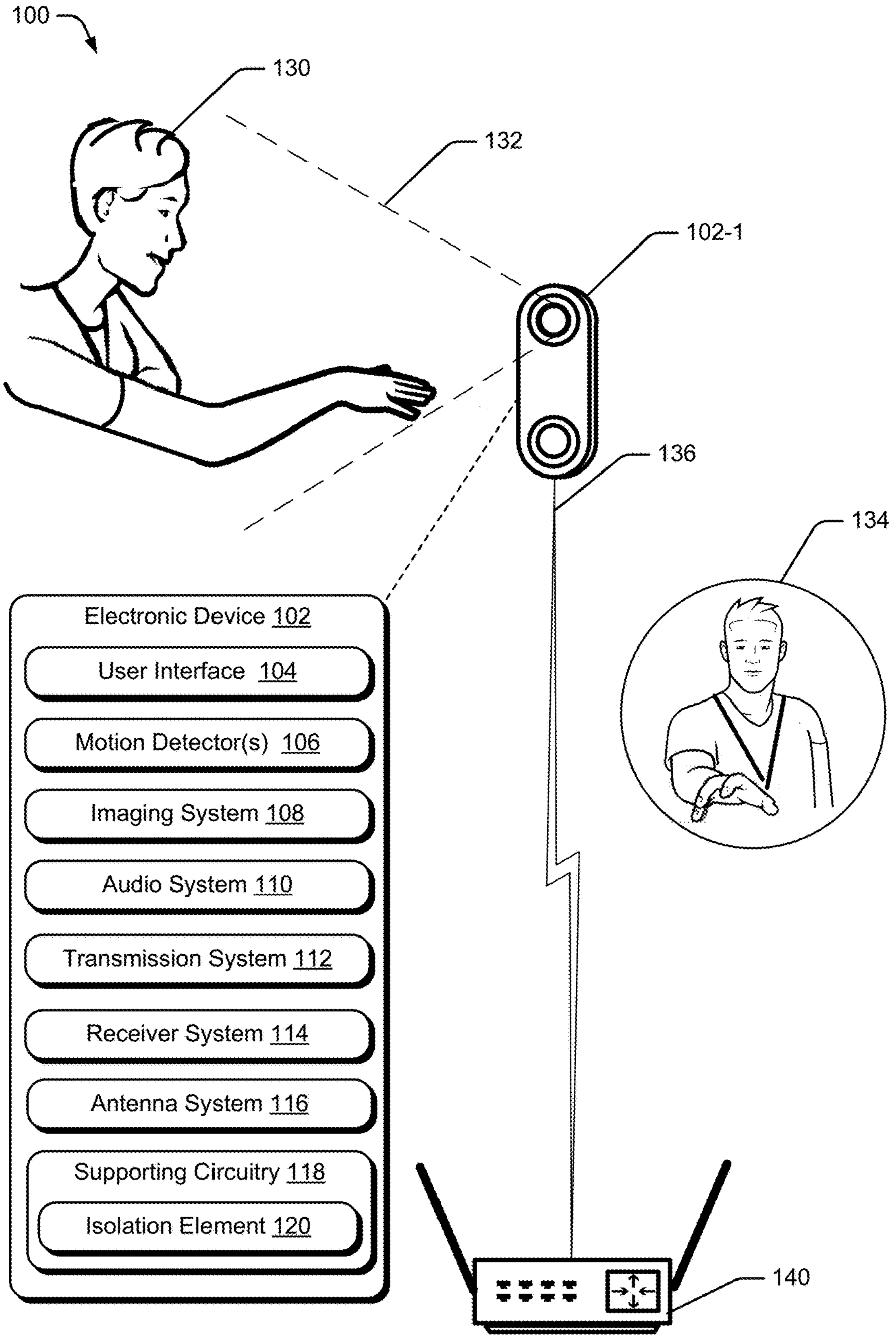
FIG. 1 illustrates an example environment in which a device including a transmission system with diversity antennas and an isolation element can be implemented.

Individuals and organizations are increasingly reliant on wireless communication devices in their homes, offices, and public locations. Wireless communications, such as those used in Wi-Fi communications, are enhanced by the use of multiple "diversity antennas." In using more than two or more diversity antennas, a transmitter, such as those incorporated in a router, access point, or other source of Wi-Fi transmissions, can generate radio frequency (RF) signals having differing radiation patterns. Because of the short wavelengths of Wi-Fi signals, on the order of centimeters (cm), the different radiation patterns achieved with multiple antennas physically separated by even a short physical distance may enhance communication despite objects that may block one of the signals.

For example, a receiver may not be able to receive a signal transmitted from a first antenna interfered with by an obstruction, such as a conductive object or an electronic device between the antenna and the source. This may be true for multiple devices that are mounted at a fixed location, such as cameras, which generate signals to communicate despite the presence of an obstacle. This may also be true for portable devices that move into locations where an obstruction is encountered. However, when diversity antennas are employed, a signal transmitted from a second antenna, even a short distance from the first antenna, may not be interfered with by that same obstruction. Thus, diversity antennas facilitate more reliable wireless communications by helping to maintain communications even when a signal from one antenna is obstructed.

To facilitate separate antennas being able to provide different radiation patterns, transmitters may deploy an isolation element between the multiple antennas. If antennas in close proximity to each other are not isolated, the signals may interfere with each other and, in effect, merge into a single radiation pattern. For example, two antennas in a transmitting device may be separated by a conductive element that is electrically coupled to a ground plane. The isolation element receives the RF signals and, in effect, locally absorbs the signals by grounding the energy of the signals to the ground plane. As a result, at least in close proximity to the antennas, interference between the signals generated by the separate antennas is limited to maintain the separate radiation patterns generated by the separate antennas. In other words, the isolation element, which is positioned within a predetermined maximum distance range of the antennas, allows for reducing interference between the signals generated by the separate antennas.

An isolation element in a router or similar device that may consist of a conductive wall or similar member physically situated between and/or near the antennas (e.g., within a predetermined distance range less than a threshold/maximum distance from each one of the antennas, such as within a distance equivalent to a quarter-wavelength of the transmission signal). However, in a compact device, it may be impractical to insert a conductive wall of this nature. In a compact device, virtually every cubic centimeter may be filled with circuitry and inserting a conductive wall either may not be possible or may result in having to increase the size of the device, neither of which is desirable. For example, wireless telephones, tablet computers, exterior wireless doorbells, and other devices with video and/or audio communications capability may be compact devices only inches in length and width and may be only a fraction of an inch thick; in such devices, there may be no room to accommodate a conductive wall to help isolate diversity antennas.

The disclosed apparatuses and techniques provide a way to isolate diversity antennas by exploiting and/or modifying components within a device to provide an isolation element to prevent radiation patterns of the antennas from interfering with each other. According to some disclosed implementations, supporting circuitry configured to perform non-transmission functions in—a device that includes transmission circuitry coupled with a plurality of antennas—may be used to provide an isolation element. As further described below, a conductor incorporated within the supporting circuitry and configured to be coupled to an electrical ground is provided as the isolation element. Such a conductor is configured to receive and ground a portion of the transmission signal from at least one of the antennas. As further described below, one or more existing components in the device may be sized or otherwise configured to provide the isolation element. In one implementation, for example, a flex connector used to connect components may include a conductive element connected to ground. In some implementations, the conductive element may have a length that is a multiple of a quarter-wavelength of the signal in order to desirably absorb signals generated be one or more antennas to prevent the antennas' signals from interfering with each other adjacent their source. Other components, such as a printed circuit board, similarly may be configured to include a conductive element coupled to ground to and used to present an isolation element. A combination of components, such as a circuit board and an attached connector, may collectively include a conductive element to present an isolation element.

Operating Environment

FIG. 1 illustrates an example environment 100 in which an isolation element for diversity antennas in an apparatus may be implemented. The example environment 100 includes an electronic device 102 in the form of an exterior doorbell 102-1 that provides video and/or audio communications. It may be appreciated that such an exterior doorbell 102-1 enables a user to monitor events occurring external to the structure where the exterior doorbell is mounted. For example, when the exterior doorbell is manually triggered by a person, a user can view and/or talk with the person before opening the door for the person. Similarly, the exterior doorbell may be triggered by a motion detector(s) to monitor or record actions by persons that may present themselves within an observation range of the exterior doorbell 102-1.

The exterior doorbell may be a very compact device to permit being readily mountable near an exterior door. While accommodating imaging and/or audio capture devices, transmission and receiver circuitry, a power source, and/or other devices, space may be at a premium within the device. Diversity antennas may be accommodated, but it may be difficult or impractical to incorporate a conductive wall within the device to isolate the diversity antennas.

Referring to FIG. 1, in the example environment 100, the exterior doorbell 102-1 may include a user interface 104 (such as a doorbell button or other activation input(s)) and/or one or more motion detectors 106 to activate the exterior doorbell 102-1 to initiate video capture or other functions. The exterior doorbell 102-1 also may include an imaging system 108, such as a camera system, and an audio system 110, such as a one-way or two-way audio intercom system. The exterior doorbell 102-1 also includes a transmission system 112 configured to send video and/or audio data, such as data captured by the imaging system 108 and the audio system 110, respectively, as well as a receiver system 114 to receive the same types of data. The transmission system 112 and the receiver system 114 may employ an antenna system 116 that, as described below, may include two or more diversity antennas. The exterior doorbell 102-1 also may include supporting circuitry 118 to support operations of the aforementioned systems, such as printed circuit boards, wiring, a power supply, and other devices that facilitate operation of the exterior doorbell 102-1 and devices incorporated therein. In various implementations, an isolation element 120 is incorporated in the supporting circuitry 118 to provide the benefit of an isolation element 120 without using space and/or weight to include a conductive wall to isolate diversity antennas.

In the example environment 100, in the presence of a person 130, the imaging system 108 of the exterior doorbell 102-1 may be activated by the person 130 engaging the user interface 104 (e.g., by pressing a doorbell button) or by the motion detector(s) 106 sensing the presence of the person 130. The imaging system 108 provides a field of view 132 to capture an image or video of the person 130 that results in imaging data 134 being included in a transmission signal 136 to be wirelessly transmitted over Wi-Fi or a similar wireless medium. The imaging data 134 may be transmitted to an access point or router 140 and then directed to or made accessible to other devices (not shown), such as computers, mobile telephones, or other devices to allow a user to access the imaging data 134.

Figure 2:
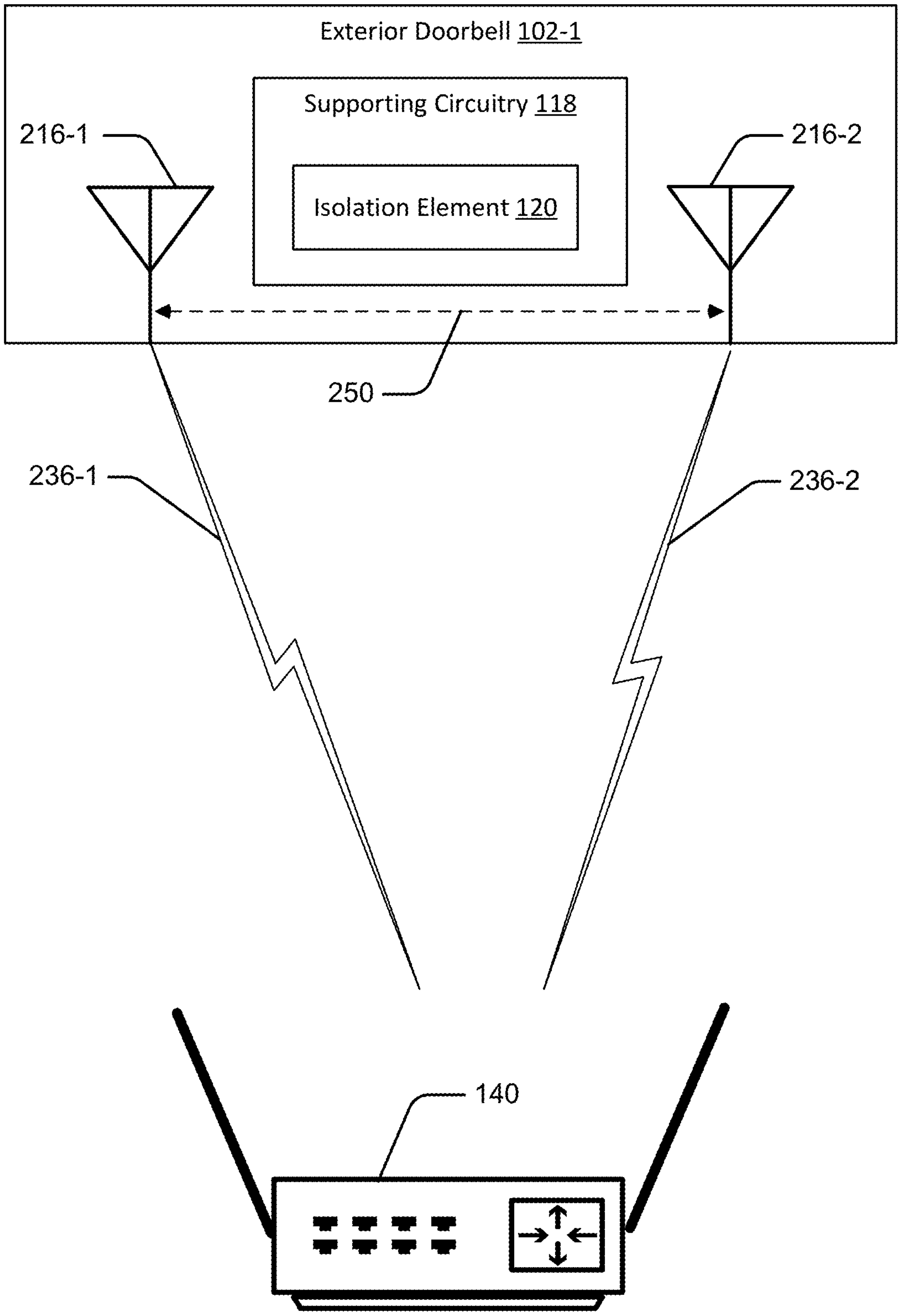
FIG. 2 illustrates an example of the device with diversity antennas and the isolation element as set forth in FIG. 1.

Referring to FIG. 2, in one example, the antenna system 116 of the exterior doorbell 102-1 includes two diversity antennas 216-1 and 216-2 to generate two different signals 236-1 and 236-2, one of which hopefully will not be interfered with by an obstruction. The diversity antennas 216-1 and 216-2 are physically separated across a displacement 250. As previously described, the displacement 250 may permit communication of one of the antennas 216-1 or 216-2 while communication of the other of the antennas 216-1 or 216-2 is blocked or interfered with. As previously described, an isolation element 120 may be used to prevent the signals 236-1 and 236-2 from interfering with each other and collapsing into a signal that would defeat the purpose of enduring the burden of including the diversity antennas 216-1 and 216-2. As further described below, the isolation element 120 is presented by repurposing and/or reconfiguring attributes of the supporting circuitry of the exterior doorbell 102-1.

Figure 3:
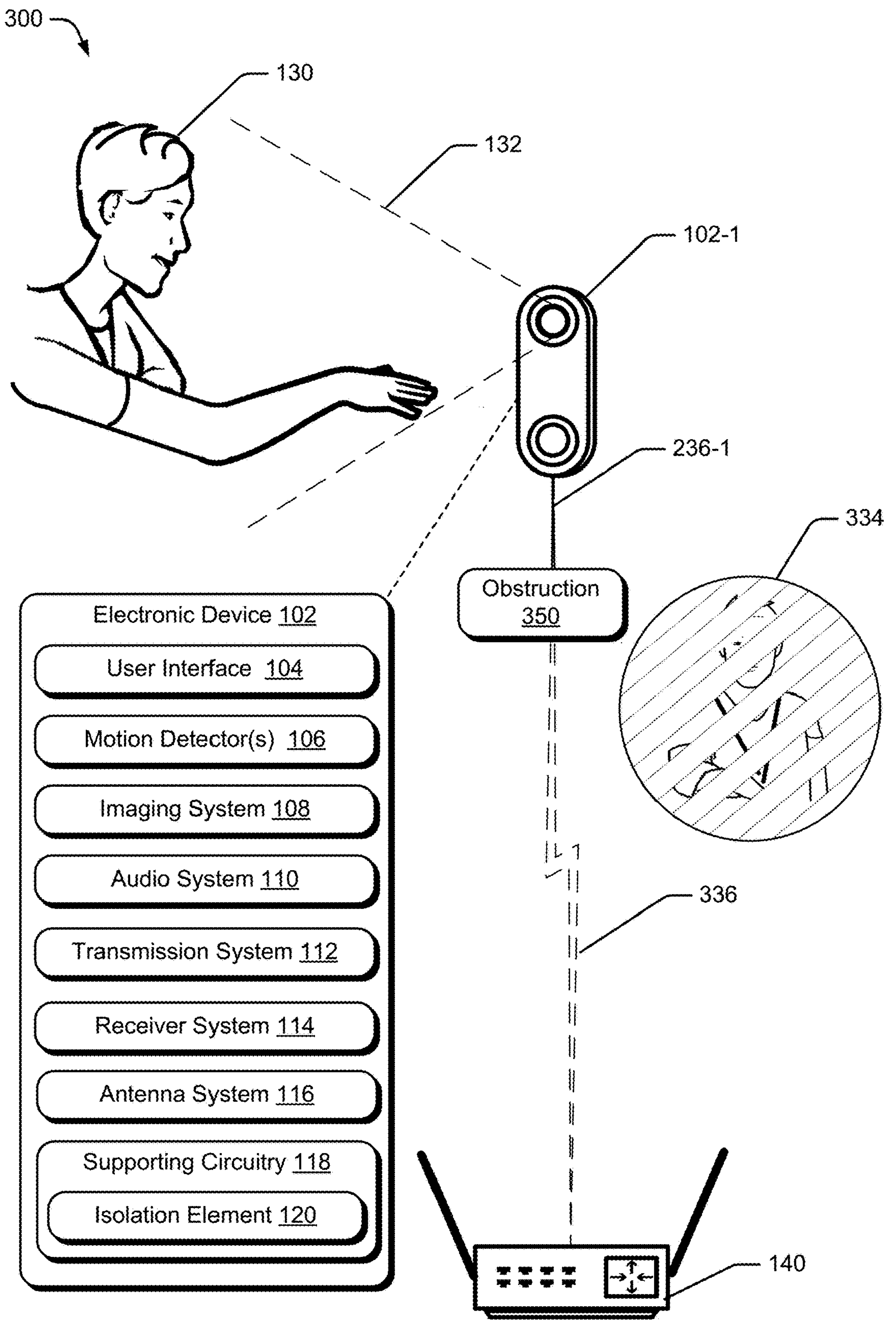
FIG. 3 illustrates an example environment in which a transmission signal from one of the diversity antennas in the device as set forth in FIG. 1 is obstructed.
Figure 4:
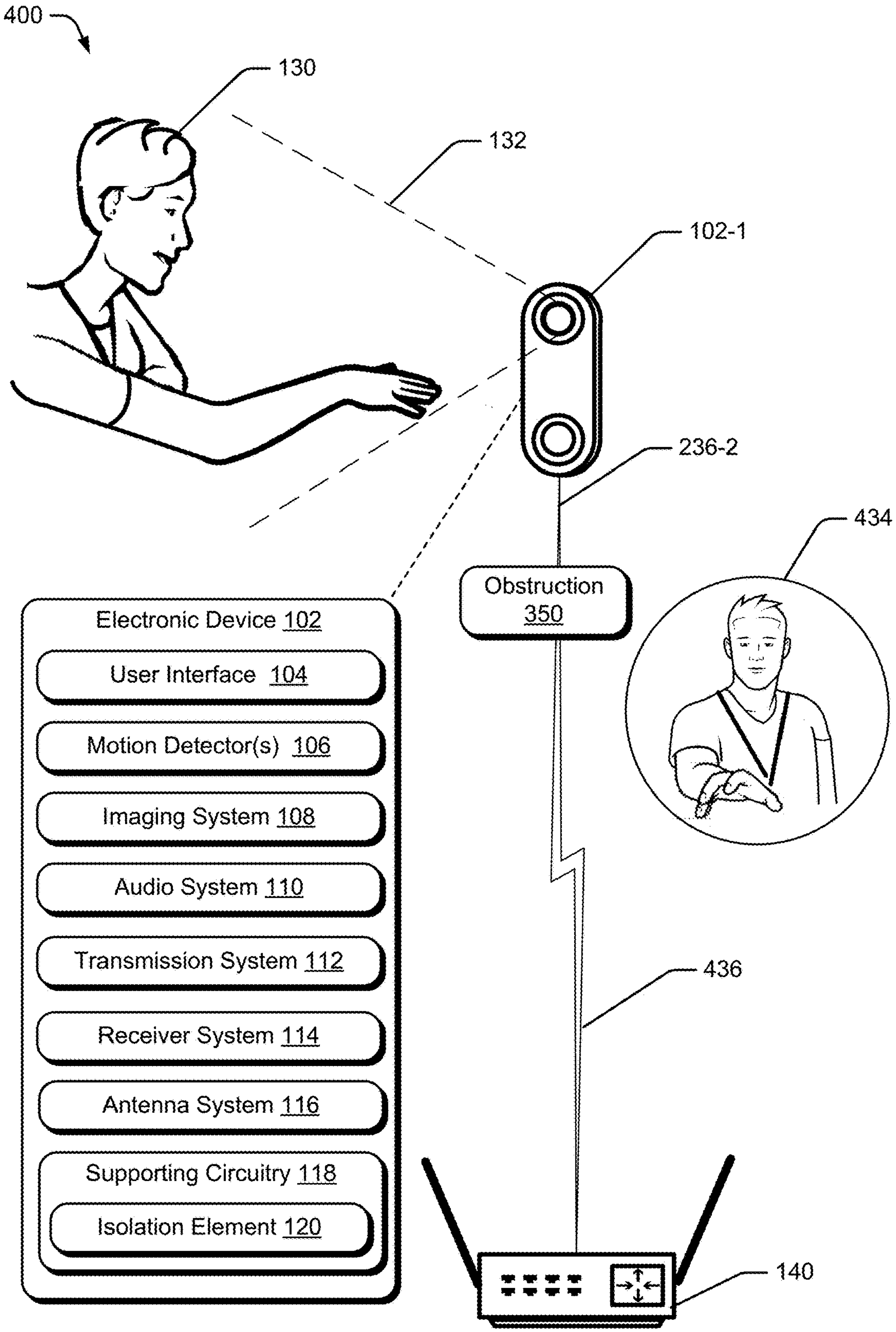
FIG. 4 illustrates an example environment in which a transmission signal from one of the diversity antennas in the device as set forth in FIG. 1 is not obstructed.

FIGS. 3 and 4 represent efficacy of the isolation element 120 in maintaining separation of the signals 236-1 and 236-2 generated by the diversity antennas 216-1 and 216-2 (shown in FIG. 2), respectively. Referring to FIG. 3, in the example environment 300, upon the exterior doorbell 102-1 being activated via the user interface 104 and/or the motion detector(s) 106, the imaging system 108 captures imaging and/or audio data of the person 130 who caused the exterior doorbell 102-1 to be activated. The data is transmitted via the transmission system 112 and the antenna system 116. The example environment 300 includes an obstruction 350, which may be a physical or electronic obstruction that at least partially blocks the signal 236-1 generated by the first antenna 216-1 (not shown in the example environment 300 of FIG. 3). As a result of the obstruction 350, a disrupted signal 336 presents corrupted or unusable imaging data 334.

Referring to FIG. 4, in the example environment 400, the signal 236-2 generated by the antenna 216-2 (not shown in FIG. 4) of the exterior doorbell 102-1 is not blocked by the obstruction 350 but becomes a usable signal 436. The displacement 250 of the antenna 216-2 from the antenna 216-1 (FIG. 2) enables the signal 236-2 to remain distinct from the signal 236-1 and thus avoid being blocked or corrupted by the obstruction 350. As a result, usable imaging data 434 is successfully transmitted from the exterior doorbell 102-1, such as via the access point or router 140, where it may be accessible and usable by a user.

Figure 5:
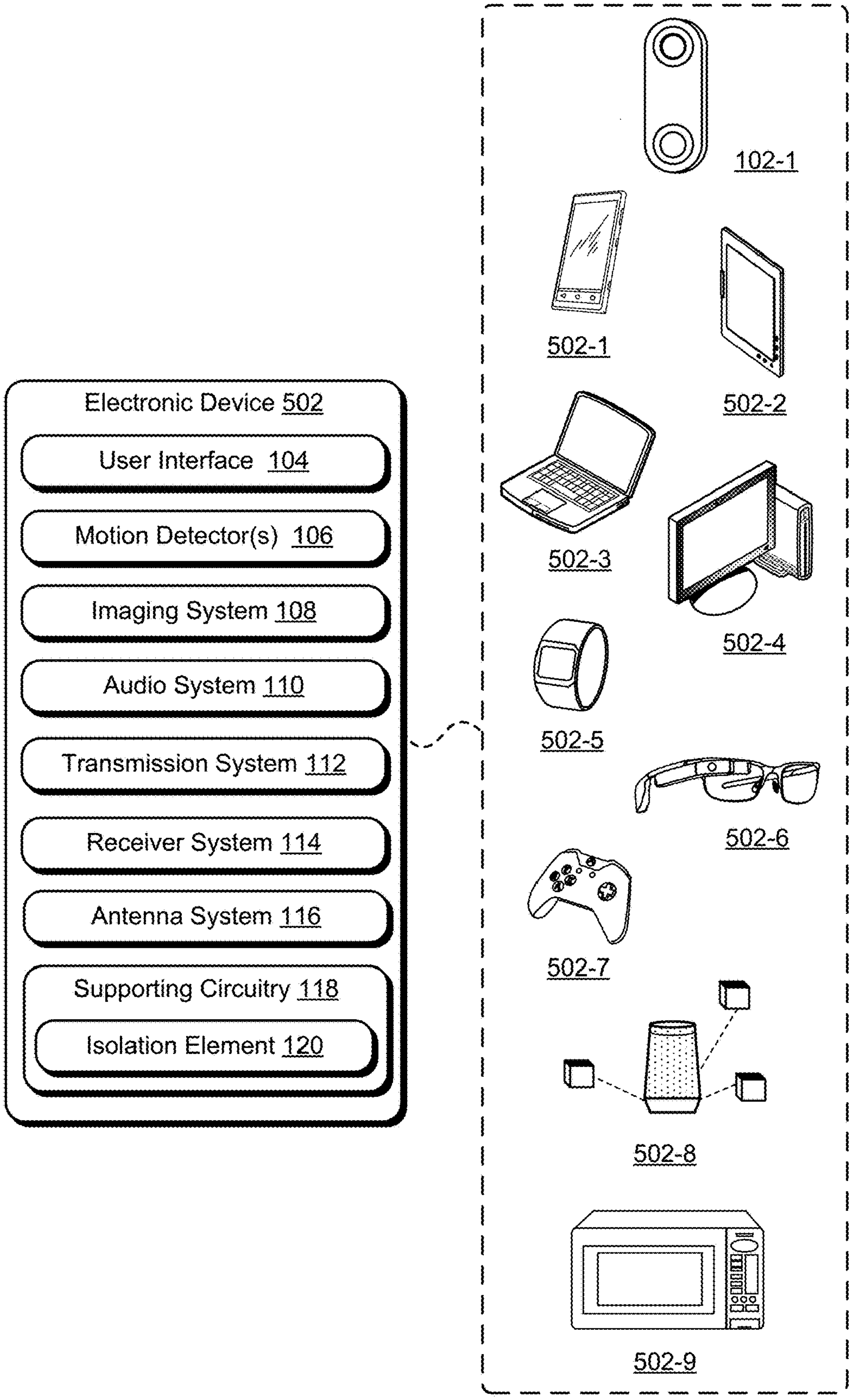
FIG. 5 illustrates examples of equipment that may include a transmission system with diversity antennas and an isolation element as set forth in FIG. 1.

Referring to FIG. 5, an electronic device 102 that may benefit from the inclusion of the isolation element 120 within the supporting circuitry 118 may include any number of devices. The electronic device 102 may include the exterior doorbell 102-1, as described with reference to FIGS. 1 through 4, as well as a smartphone 502-1, a tablet 502-2, a laptop 502-3, a desktop computer 502-4, a computing watch 502-5, computing spectacles 502-6, a gaming system 502-7, a home-automation and control system 502-8, and a microwave 502-9. The electronic device 102 may also include other devices, such as televisions, entertainment systems, audio systems, automobiles, drones, track pads, drawing pads, netbooks, e-readers, home security systems, and other home appliances. Note that the electronic device 102 can be wearable, non-wearable but mobile, or relatively immobile (e.g., desktops and appliances). Although further explanation of the inclusion of the isolation element 120 within supporting circuitry 118 is made in the context of an exterior doorbell 102-1, it will be appreciated that an isolation element 120 within supporting circuitry 118 may similarly be incorporated in others of the electronic devices 502-1 through 502-9, as well as in any other electronic devices.

Figure 6:
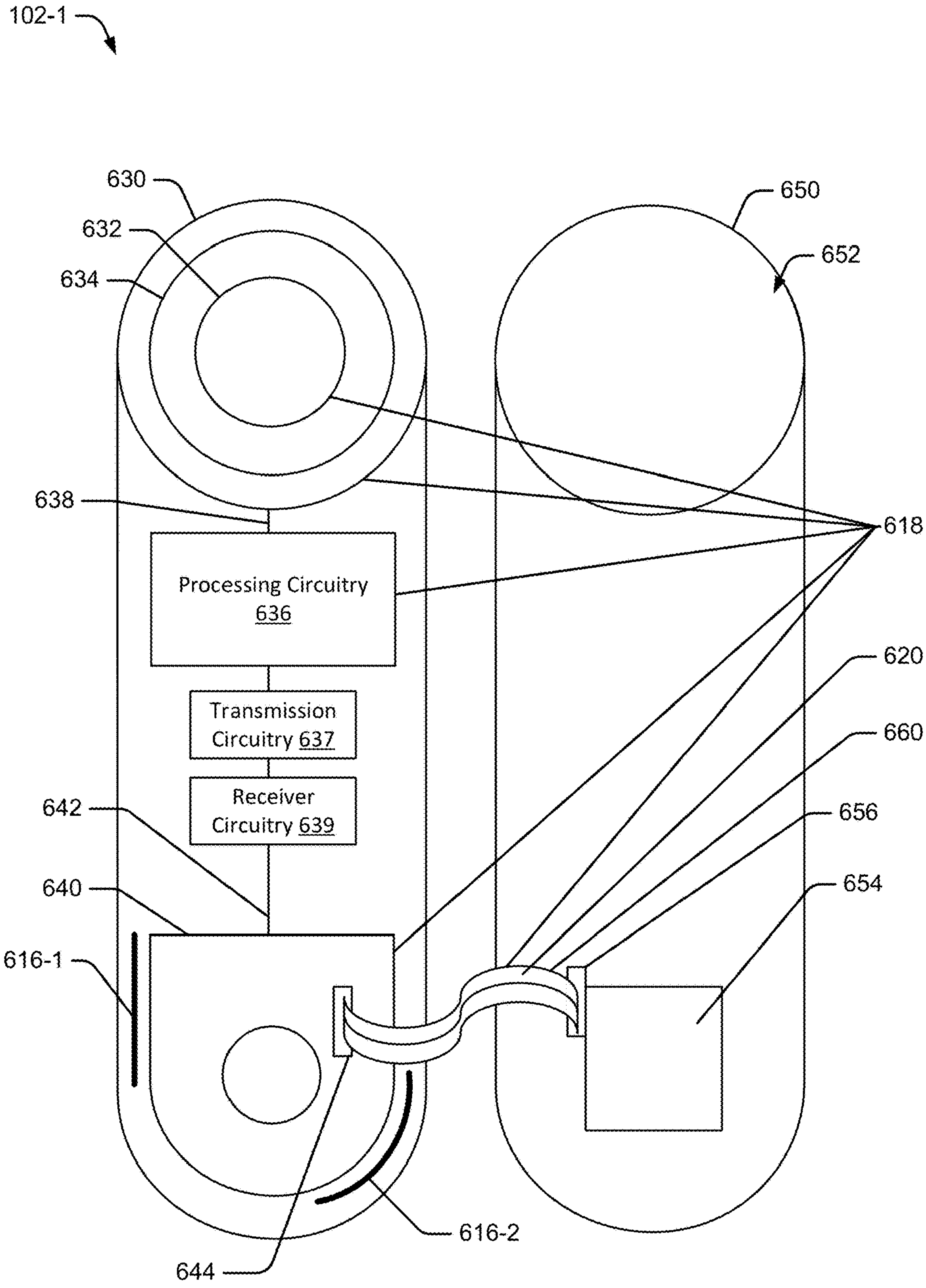
FIG. 6 illustrates a device including a transmission system with diversity antennas and a wiring connector that includes the isolation element as set forth in FIG. 1.

Referring to FIG. 6, an interior of the exterior doorbell 102-1 is shown to illustrate an example of an isolation element 620 (e.g., isolation element 120) incorporated in supporting circuitry 618 (e.g., supporting circuitry 118) of the exterior doorbell 102-1. Although the isolation element 620 is described in the context of the exterior doorbell 102-1, it will be appreciated that similar implementations could be made in any of the other electronic devices 502-1 through 502-9 as described with reference to FIG. 5 or in other electronic devices. The description of the exterior doorbell 102-1 is by way of example and not by way of limitation; the exterior doorbell 102-1 may be in various configurations. Similarly, the other devices 502-1 through 502-9 of FIG. 5 also may include implementations of isolation elements in various configurations.

The implementation of the exterior doorbell 102-1 of FIG. 6 includes a first housing (e.g., rear housing 630) and a second housing (e.g., front housing 650). The rear housing 630 includes an imaging device 632 and at least one audio device 634. The imaging device 632 and the audio device 634 are coupled to processing circuitry 636 by suitable connective wiring 638, both of which also may be accommodated within the rear housing 630. The processing circuitry 636 may include systems such as image and sound processing circuitry, a power supply and electrical ground, and other circuitry (not shown in FIG. 6) used to facilitate the functions of the exterior doorbell 102-1 as previously described. The processing circuitry 636 may interact or communicate with transmission circuitry 637 to process signals to be transmitted by the transmission circuitry 637. The processing circuitry 636 may also interact or communicate with receiver circuitry 639 to process signals received by the receiver circuitry 639. The rear housing 630 also may include additional circuitry 640 which may be coupled to the other devices by additional connective wiring 642. The additional circuitry 640 also may include a coupling 644 to receive a wiring connector 660 extending from a device which, for example, may be incorporated within the rear housing 630 or in the front housing 650, the latter of which is further described below. The rear housing 630 also accommodates diversity antennas including a first antenna 616-1 (e.g., antenna 216-1) and a second antenna 616-2 (e.g., antenna 216-2) which are electrically coupled to the transmission circuitry 637 and receiver circuitry 639 (electrical couplings to the antennas 616-1 and 616-2 are not shown in FIG. 6).

The front housing 650 may include at least one access opening 652 to provide environmental access for the imaging device 632 and the audio device 634. The front housing 650 also may accommodate an input device 654, such as button circuitry, to activate the exterior doorbell 102-1. The input device 654 may include a coupling 656 to receive a wiring connector 660 that connects the input device 654 to the additional circuitry 640. As shown, the wiring connector 660 may be a flex connector, which are commonly used to connect components that may be moved relative to each other in assembling or disassembling a device, such as the exterior doorbell 102-1.

The systems described herein, such as the imaging device 632, the audio device 634, the processing circuitry 636, the additional circuitry 640, connective wiring 638 and 642, the input device 654, the couplings 644 and 656, and the wiring connector 660 all may be considered as supporting circuitry 618 to the transmission circuitry 637 and the receiving circuitry 639. The supporting circuitry 618 includes a number of conductive components, such as the wiring connector 660, which, as further described below, may be sized and/or configured to act as an isolation element. The systems and wiring directly involved in sending signals, such as the transmission circuitry 637, the receiving circuitry 639, the antennas 616-1 and 616-2, and their interconnecting wiring are not regarded as supporting circuitry 618. It will be appreciated that the isolation element exists separately from the transmission circuitry 637, the receiving circuitry 639, the antennas 616-1 and 616-2, and their interconnecting wiring in order to provide the function of receiving at least a portion of the transmitted signals to present an isolation element.

Figure 7:
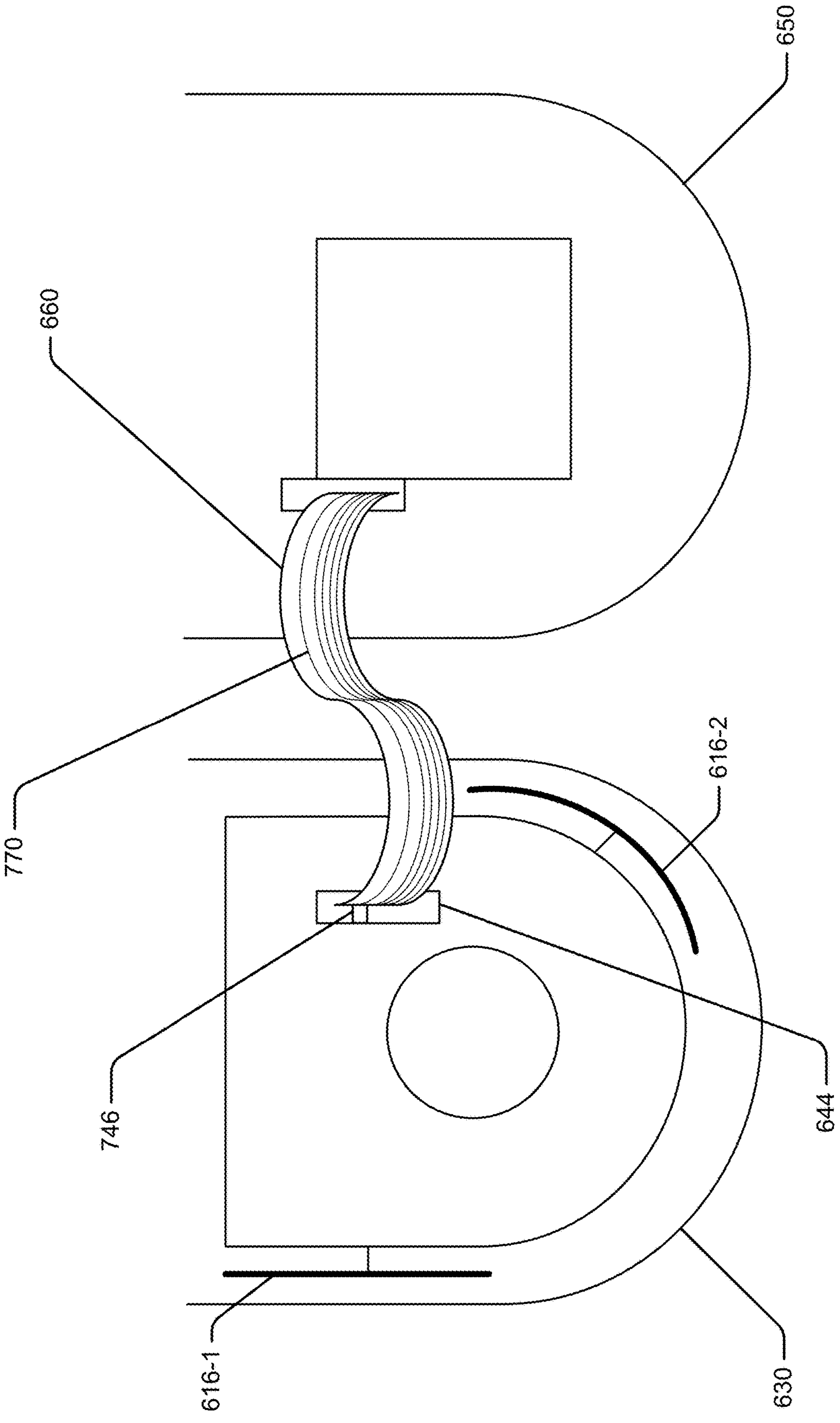
FIG. 7 illustrates an enlarged view of the device of FIG. 6 showing a wiring connector that includes a conductor that serves as the isolation element as set forth in FIG. 1.

Referring to FIG. 7, the wiring connector 660 is configured as an example of utilizing a portion of the supporting circuitry 618 (FIG. 6) to present the isolation element. The wiring connector 660 includes a ground conductor 770 that is coupled to an electrical ground coupling 746, which is represented by a ground terminal. The electrical ground coupling 746 may be incorporated in the coupling 644 as shown or may be in the form of a separate coupling. When the front housing 650 is joined with the rear housing 630 in assembling the exterior doorbell 102-1 as shown in FIGS. 1, 3, and 4, the wiring connector 660 and included ground conductor 770 are positioned near the antennas 616-1 and 616-2. Thus, utilizing supporting circuitry 618 within the exterior doorbell 102-1, an isolation element is provided without having to incorporate a separate conductive wall or other conductive structure to present the isolation element.

Figure 8:
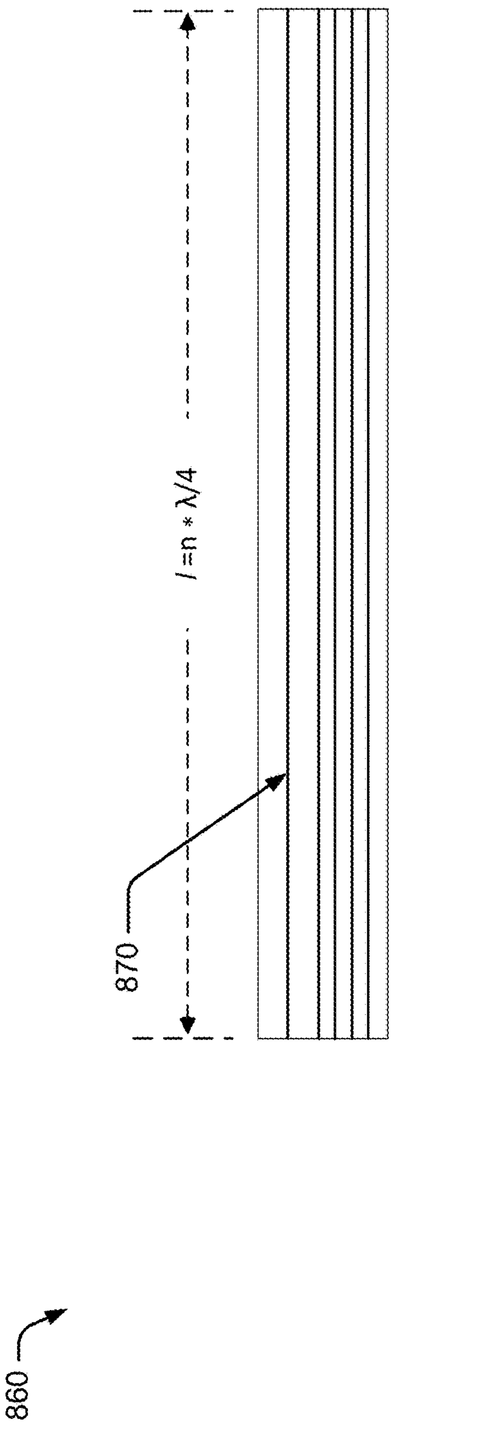
FIG. 8 illustrates a wiring connector as set forth in FIG. 7 sized to present an isolation element.

FIGS. 8 through 11 illustrate implementations of the wiring connector to facilitate presentation of the isolation element. Referring to FIG. 8, a wiring connector 860 (e.g., wiring connector 660) is sized to a length l that is a multiple of a quarter-wavelength λ/4 (e.g., l=n*λ/4), where the wavelength is the expected wavelength of a signal to be received. It will be understood by one ordinarily skilled in RF technology that a conductive device that is a multiple of a quarter-wavelength of a signal to be received facilitates reception of the signal. Accordingly, by presenting the ground conductor 870 (e.g., ground conductor 770) at a length l that is a multiple of the quarter-wavelength λ/4, the ground conductor 870, when coupled to electrical ground, receives at least a portion of the expected signal and shunts the portion of the signal to electrical ground to isolate the diversity antennas 616-1 and 616-2 (FIGS. 6 and 7). Sizing the entire wiring connector 860 to the length l, a multiple of the quarter-wavelength λ/4, readily facilitates presentation of the ground conductor 870 at a desirable length. In an example (e.g., shown in FIGS. 6, 7, and/or 12), a portion of ground conductor 870 is physically within one wavelength of each or both of the antennas 616-1 and 616-2 when the device (exterior doorbell 102-1) is fully assembled. In another example, the entire ground conductor 870 is physically within one wavelength of one or both of the antennas 616-2 and 616-2 when the device (exterior doorbell 102-1) is fully assembled. The wavelength of the signal to be received may be on the order of 12.5 cm for a 2.4 GHz signal or on the order of 6 cm for a 5.0 GHz signal.

Figure 9:
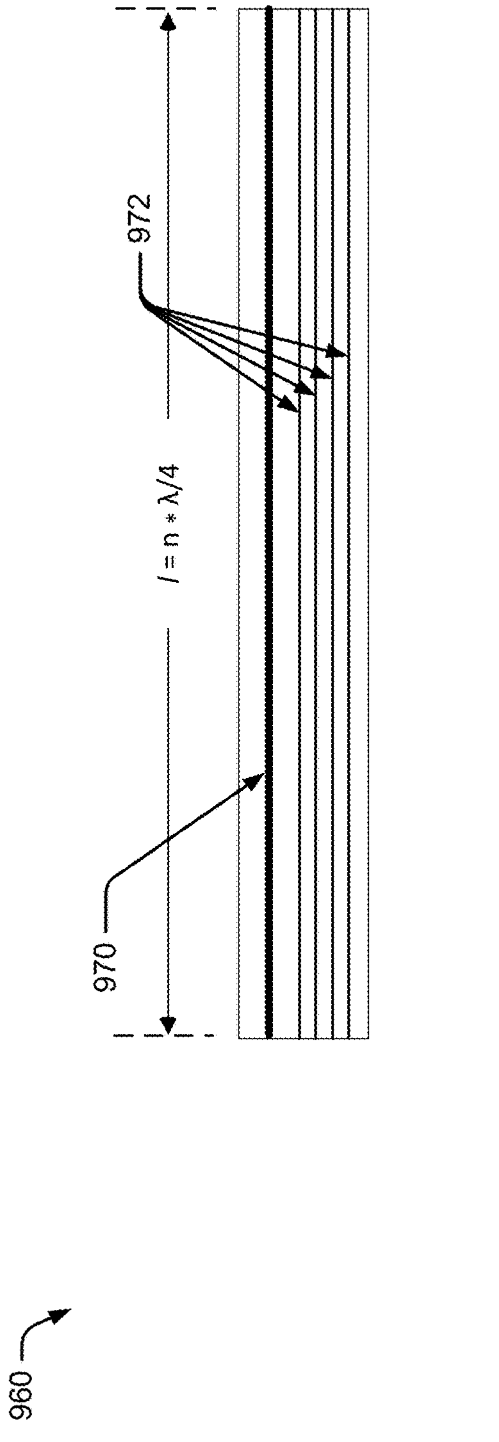
FIG. 9 illustrates a wiring connector as set forth in FIG. 7 with a ground conductor having an enlarged cross section to facilitate operation as an isolation element.

Referring to FIG. 9, in various implementations, a ground conductor 970 (e.g., ground conductor 770) of a wiring connector 960 (e.g., wiring connector 660) may have a cross-section that is wider than a cross-section of another or others of the signal conductors included in the wiring connector 960 (as represented by the larger thickness of the ground conductor 970 as compared to that of other conductors 962 included in the wiring connector 960). It will be appreciated by those of ordinary skilled in electronics that the larger the cross-section of a conductor, the more readily the conductor conducts a signal. Thus, by broadening the cross-section of the ground conductor 970, the ground conductor 970 more readily receives a signal and conducts the signal to electrical ground to enhance the ability of the ground conductor 970 to serve as an isolation element. It will be appreciated that the ground conductor 970 having the broadened cross-section may be combined with various implementations of the isolation element, including the implementations described with reference to FIGS. 10 and 11, below.

Figure 10:
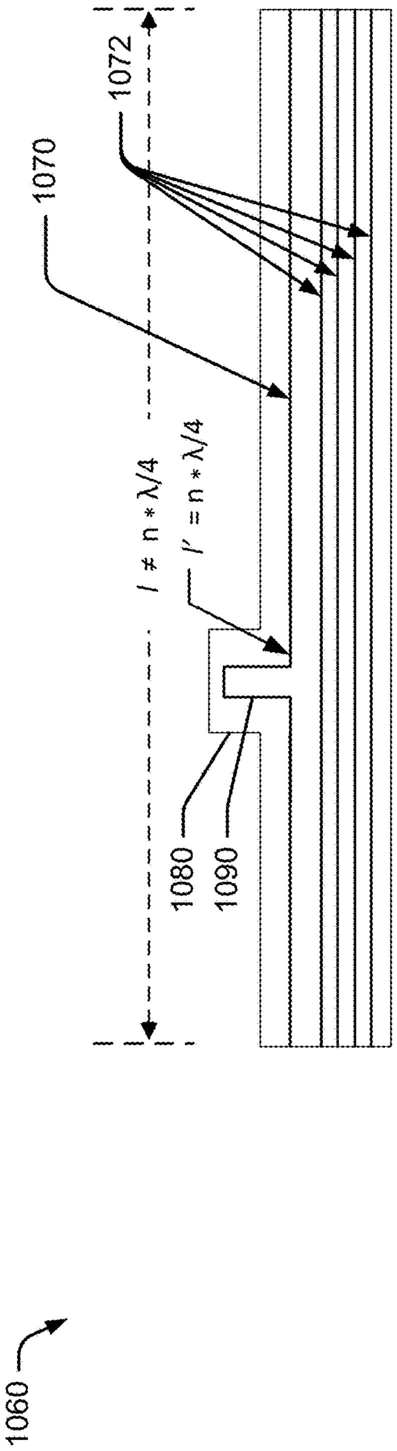
FIG. 10 illustrates a wiring connector as set forth in FIG. 7 with an extension stub along its length sized to lengthen the ground conductor to serve as an isolation element.
Figure 11:
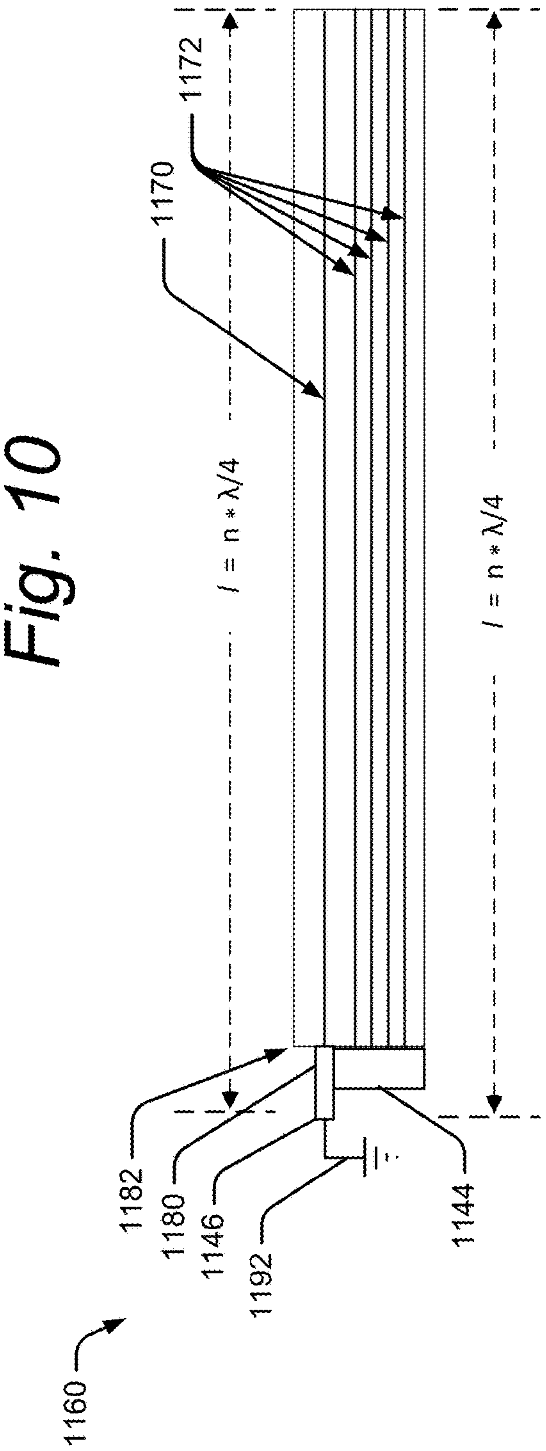
FIG. 11 illustrates a wiring connector as set forth in FIG. 7 with an extension stub at its end sized to lengthen the ground conductor to serve as an isolation element.

Referring to FIGS. 10 and 11, it will be appreciated that, while sizing a wiring connector to a desired length l that is a multiple of the quarter-wavelength λ/4 may simplify presentation of an isolation element, the ground conductor may be sized to the desired length without sizing the entire wiring connector to the length l. Referring to FIG. 10, a wiring connector 1060 (e.g., wiring connector 660) may include an extension stub 1080 extending from a side of the wiring connector 1060 to accommodate an extended section 1090 of the ground conductor 1070 (e.g., ground conductor 770) to make the total length of the ground conductor 1070 equal to the length l that is a multiple of the quarter-wavelength λ/4. Thus, the ground conductor 1070 may be of the desired length l even when the length of the wiring connector 1060—and the other conductors 1072 therein—is not equal to the length l.

Referring to FIG. 11, by contrast to the wiring connector 1060 (FIG. 10) having an extension stub along a length of the wiring connector 1060, a wiring connector 1160 (e.g., wiring connector 660) may include an extension stub 1180 extending from an end 1182 of the wiring connector 1160 to make the length of the ground conductor 1170 (e.g., ground conductor 770) equal to the length l that is a multiple of the quarter-wavelength λ/4. Thus, the ground conductor 1170 may be of the desired length l even when the length of the wiring connector 1160—and the other conductors 1172 (e.g., other conductors 972) therein—is not equal to the length l. The extension stub 1180 may be part of the ground conductor 1170 or may include a separate structure attached to the ground conductor 1170 and connected to ground 1192. Optionally, the separate structure may be part of a ground coupling 1146 that receives the ground conductor 1170 or part of a coupling 1144 that receives the ground conductor 1170 and the other conductors 1172 of the wiring connector 1160.

It will be appreciated that incorporating the isolation element in a wiring connector may be a convenient choice because the isolation element may be added without adding a separate structure to the overall device. Instead, a configuration or modification of an existing component, such as a wiring connector, may provide the advantages of including an isolation element without having to redesign the device to accommodate inclusion of a separate isolation element.

Figure 12:
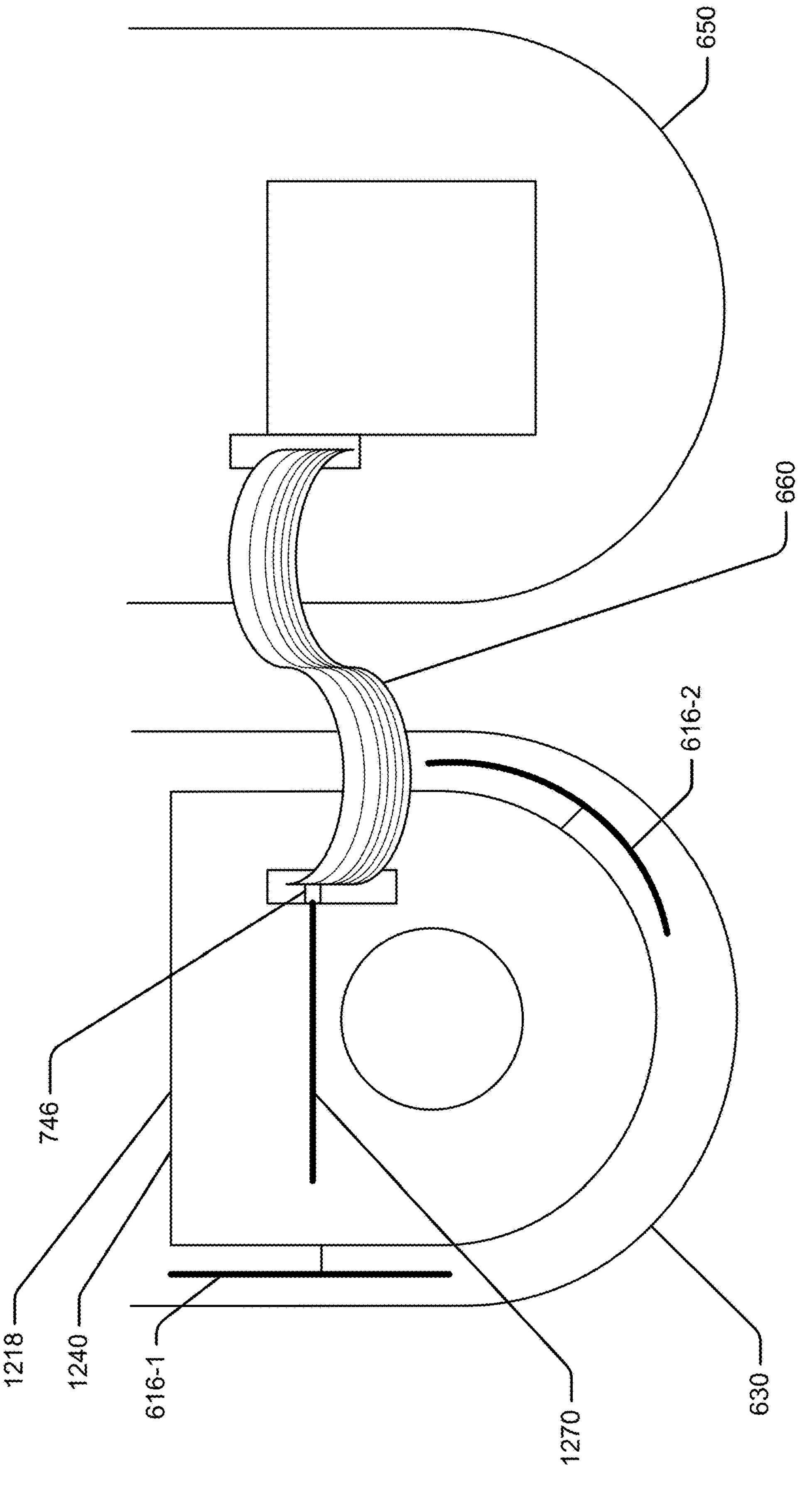
FIG. 12 illustrates an isolation element incorporated onto a circuit board of the supporting circuitry.

However, without including a separate structure to present an isolation element, the isolation element may be presented other than in the form of the wiring connector. In one example, if supporting circuitry includes available space, a conductive trace on a circuit board or other device may be used as an isolation element. Referring to FIG. 12, the supporting circuitry 1218 (e.g., supporting circuitry 118), such as additional circuitry 1240 (e.g., additional circuitry 640), may be modified to include a conductive trace 1270 to provide an isolation element. When the front housing 650 is joined with the rear housing 630 in assembling the exterior doorbell 102-1 as shown in FIGS. 1, 3, and 4, the wiring connector 660 is positioned near the antennas 616-1 and 616-2. The conductive trace 1270 is desirably sized to the length l that is a multiple of the quarter-wavelength λ/4 as described with reference to FIGS. 8 through 11. The conductive trace 1270 may extend directly from the electrical ground coupling 746. Located on the supporting circuitry 1218 near the antennas 616-1 and 616-2, the conductive trace 1270 thus provides an isolation element. The conductive trace 1270 may be curved or straight and may include a broader cross-section than other traces (not shown) included on the supporting circuitry 1218 to facilitate operation of the isolation element, as described with reference to FIG. 9.

It will be appreciated that while antennas 616-1 and 616-2 are depicted to be accommodated in the rear housing 630, at least one of antennas 616-1, 616-2 may also be located in the front housing 650. Nevertheless, wiring connector 660, 760, 860, 960, 1060, 1160 with ground conductor 770, 870, 970, 1070, 1170, may positioned near the antennas 616-1, 616-2 (within a predetermined distance range from each one of the antennas 616-1, 616-2), in a joint position of the front and rear housings 650, 630.

Example Method

This section illustrates example methods, which may operate to present an isolation element. The example methods are provided by way of illustration and not by way of limitation. Attributes described in the various implementations herein described may be used together or separately to perform the function of providing an isolation element.

Figure 13:
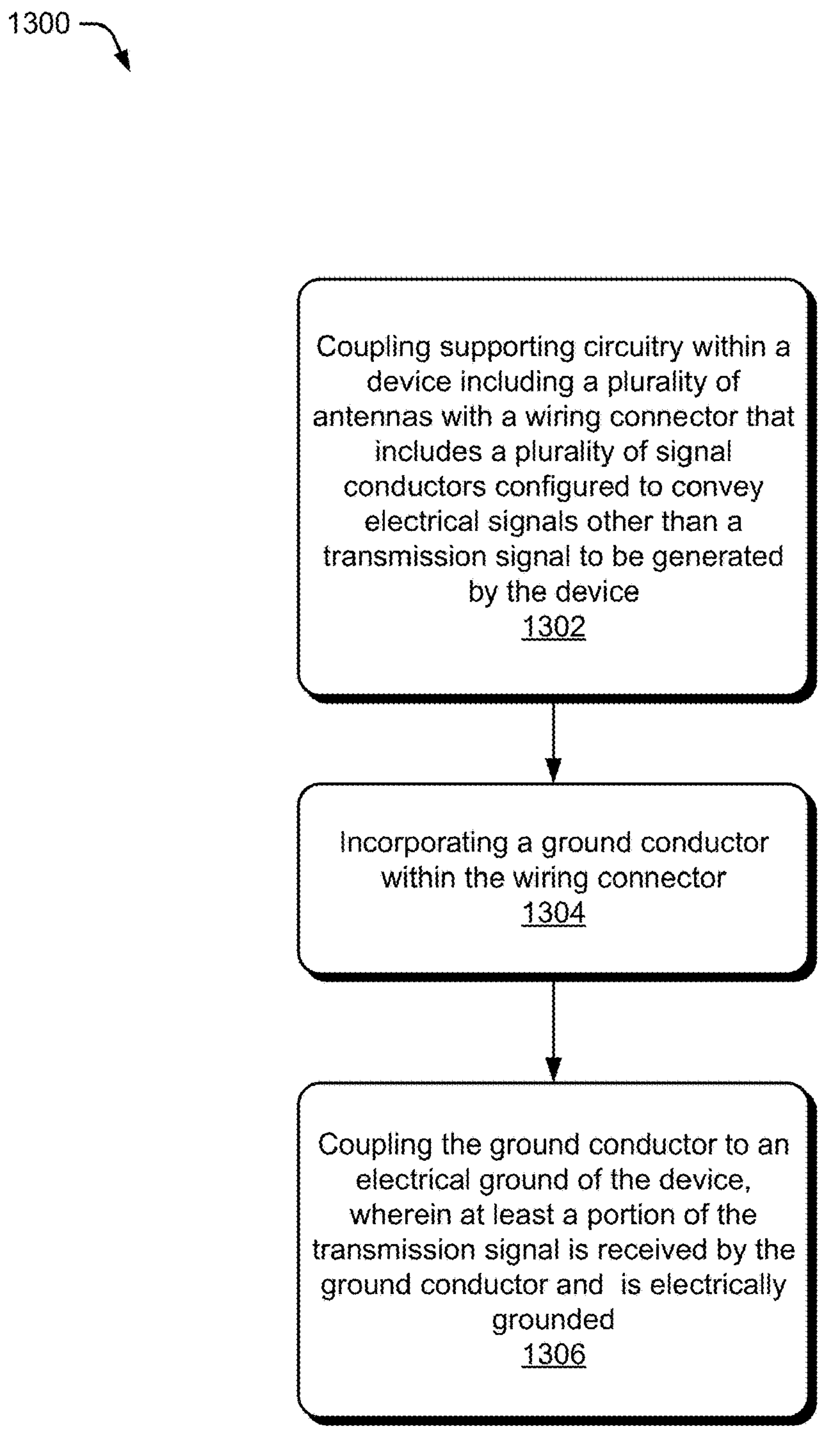
FIG. 13 illustrates an example method for using supporting circuitry to present an isolation element for diversity antennas.

FIG. 13 depicts an example method 1300 for providing an isolation element using supporting circuitry included in a device that includes transmission circuitry. The method 1300 is shown as a set of blocks that specify operations performed but are not necessarily limited to the order or combinations shown for performing the operations by the respective blocks. In portions of the following discussion, reference may be made to the example operating environment 100 of FIG. 1 or to example operating environments as detailed in other figures, reference to which is made for example only. The techniques are not limited to performance by one entity or multiple entities operating on one device.

At 1302, supporting circuitry within a transmission device including a plurality of antennas is connected with a wiring connector that includes a plurality of signal conductors configured to convey electrical signals other than a transmission signal to be generated by the transmission device.

At 1304, a ground conductor is incorporated within the wiring connector. As described with reference to FIG. 7, the wiring connector includes a conductor that is connectable to electrical ground to present the ground conductor.

At 1306, the ground conductor is coupled to an electrical ground of the transmission device, wherein at least a portion of the transmission signal is received by the ground conductor and is electrically grounded. In an example, as also described with reference to FIG. 7, electrically grounding the ground conductor allows at least a portion of the transmission signal to be shunted to ground to facilitate operation of the isolation element.

Figure 14:
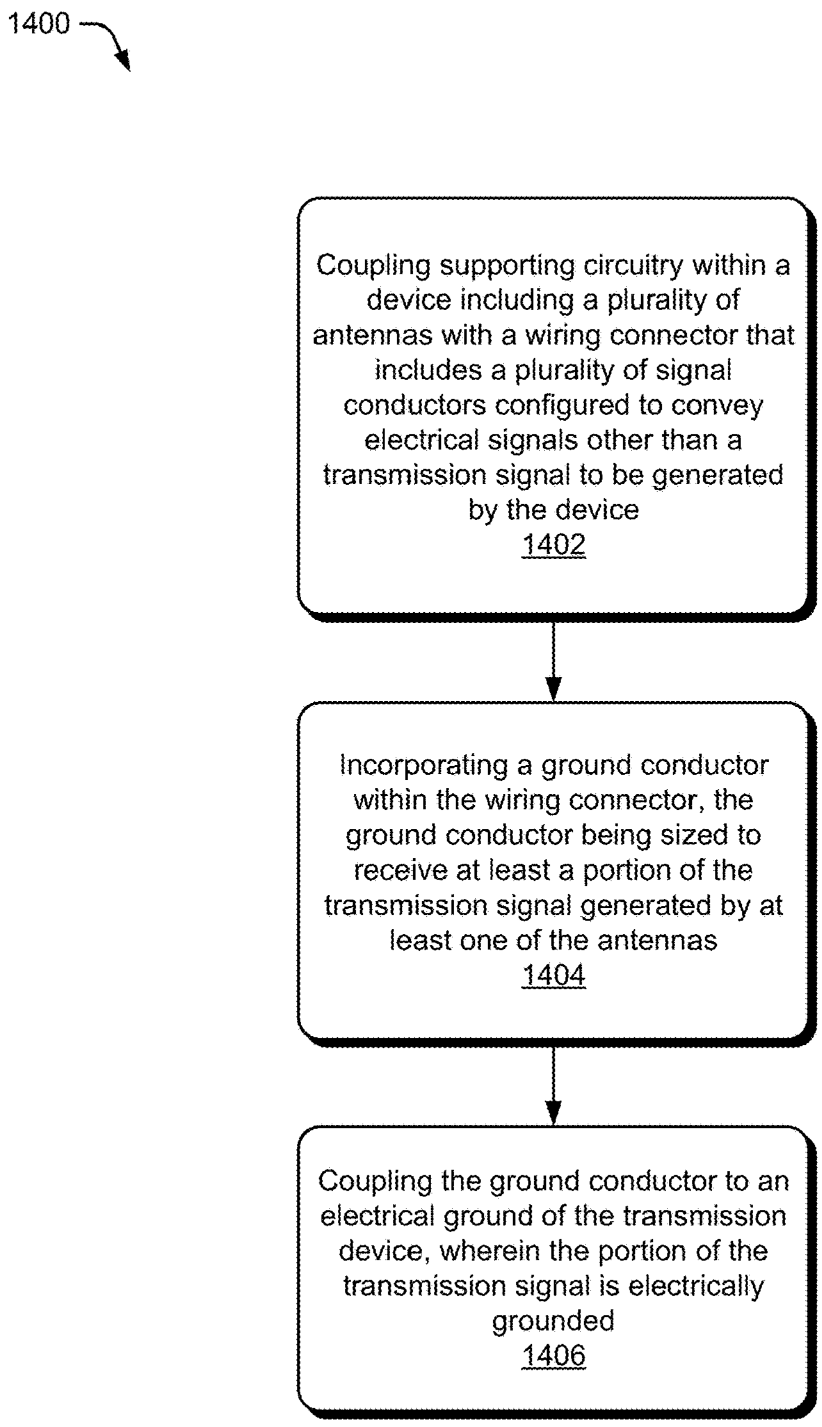
FIG. 14 illustrates another example method for using supporting circuitry to present an isolation element for diversity antennas.

FIG. 14 depicts another example method 1400 for providing an isolation element using supporting circuitry included in a device that includes transmission circuitry.

At 1402, supporting circuitry within a transmission device including a plurality of antennas is connected with a wiring connector that includes a plurality of signal conductors configured to convey electrical signals other than a transmission signal to be generated by the transmission device.

At 1404, a ground conductor is incorporated within the wiring connector, the ground conductor being sized to receive at least a portion of the transmission signal generated by at least one of the antennas. For example, as described with reference to FIGS. 8 through 11, the ground conductor may be sized and/or shaped to have a length/that is a multiple of the quarter-wavelength λ/4 of the expected signal.

At 1406, the ground conductor is coupled to an electrical ground of the transmission device, wherein the portion of the transmission signal is received by the ground conductor and is electrically grounded.

Figure 15:
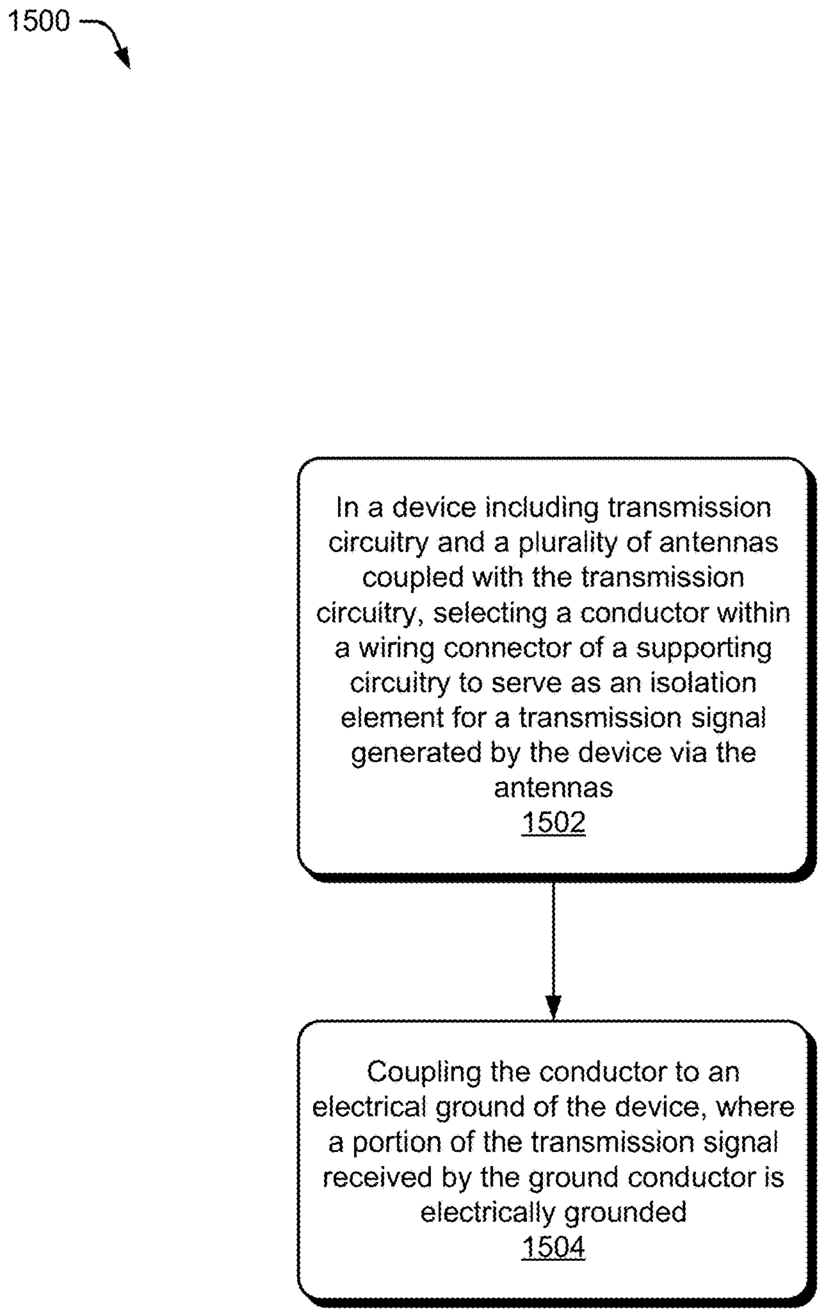
FIG. 15 illustrates an example method for using a conductor within a wiring connector to present an isolation element for diversity antennas.

FIG. 15 depicts another example method 1500 for providing an isolation element using supporting circuitry included in a device that includes transmission circuitry.

At 1502, in a device including transmission circuitry and a plurality of antennas coupled with the transmission circuitry, a conductor within a wiring connector of a supporting circuitry is selected to serve as an isolation element for a transmission signal generated by the device via the antenna.

At 1504, the conductor is coupled to an electrical ground of the device, where a portion of the transmission signal received by the ground conductor is electrically grounded.

Following step 1306 (FIG. 13), 1406 (FIG. 14), and 1504 (FIG. 15) and referring to the embodiment of FIGS. 6 to 13, the ground conductor (forming the isolation element for the antennas) may then be arranged in the housing 630, 650 of the device 102-1 such that the ground conductor connects a first section of supporting circuitry arranged in a first housing (e.g., rear housing 630) to a second section of the supporting circuitry arranged in a second housing (e.g., front housing 650). In this way, when the first and second housings are in a joint position, the ground conductor is arranged near the antennas, i.e., within a predetermined distance range to each one of the antennas, for reducing interference between signals generated by the separate antennas.

EXAMPLES

In the following section, examples are provided.

Example 1: An apparatus comprising supporting circuitry configured to perform non-transmission functions in a device including transmission circuitry coupled with a plurality of antennas configured to transmit a transmission signal; and a conductor incorporated within the supporting circuitry and configured to be coupled to an electrical ground, the conductor configured to receive and ground a portion of the transmission signal from at least one of the antennas.

Example 2: The apparatus of example 1, wherein the supporting circuitry includes a wiring connector including the conductor and a plurality of signal conductors configured to conduct electrical signals other than the transmission signal.

Example 3: The apparatus of examples 1 or 2, wherein a cross-section of the conductor is wider than a cross-section of another of the signal conductors.

Example 4: The apparatus of example 2, wherein the wiring connector includes a flex connector.

Example 5: The apparatus of any preceding example, wherein the conductor has a length that is a multiple of a quarter-wavelength of the transmission signal.

Example 6: The apparatus of any one of examples 2 to 4 and of example 5, wherein the wiring connector includes an extension stub configured to extend the length of the conductor to the multiple of the quarter-wavelength of the transmission signal.

Example 7: The apparatus of example 6, wherein the extension stub is disposed at a midpoint of the wiring connector or at an end of the wiring connector.

Example 8: The device of example 1, wherein the device comprises a housing in which the transmission circuitry, the plurality of antennas, and the supporting circuitry are disposed.

Example 9: The device of example 8, wherein: the housing of the device includes a first housing and a second housing; a first section of the supporting circuitry is arranged in the first housing; and a second section of the supporting circuitry is arranged in the second housing.

Example 10: The device of example 9, wherein: the supporting circuitry includes a wiring connector including the conductor and a plurality of signal conductors configured to conduct electrical signals other than the transmission signal; and the wiring connector connects the first and second sections.

Example 11: The device of example 10, wherein, in a joint position of the first and second housings, the conductor of the wiring connector is positioned within a predetermined distance range from each one of the antennas of the plurality of antennas.

Example 12: The device of example 9, wherein the plurality of antennas is located in the first housing or the second housing; or at least one antenna of the plurality of antennas is located in the first housing and at least one other antenna of the plurality of antennas is located in the second housing.

Example 13: An apparatus comprising transmission circuitry configured to transmit a transmission signal; a plurality of antennas coupled with the transmission circuitry; supporting circuitry configured to perform non-transmission functions within the device; a wiring connector extending between sections of the supporting circuitry, the wiring connector including a conductor coupled to an electrical ground within the device, wherein the conductor is configured to receive and ground a portion of the transmission signal from at least one of the antennas.

Example 14: The device of example 13, wherein the wiring connector includes a plurality of signal conductors configured to conduct electrical signals other than the transmission signal.

Example 15: The device of example 14, wherein a cross-section of the conductor is wider than a cross-section of another of the signal conductors.

Example 16: The device of example 14, wherein the wiring connector includes a flex connector.

Example 17: The device of any one of examples 13 to 16 wherein the conductor has a length that is a multiple of a quarter-wavelength of the transmission signal.

Example 18: The device of any one of examples 13 to 16 and of example 17, wherein the wiring connector includes an extension stub configured to extend the length of the conductor to the multiple of the quarter-wavelength of the transmission signal.

Example 19: The device of example 18, wherein the extension stub is disposed at a midpoint of the wiring connector or at an end of the wiring connector.

Example 20: The device of example 13, wherein the device is configured to be mounted at a fixed location.

Example 21: The device of example 20, wherein the device includes an exterior doorbell configured to transmit at least one of video and audio information captured at the fixed location.

Example 22: A method comprising coupling supporting circuitry within a device including a plurality of antennas with a wiring connector that includes a plurality of signal conductors configured to convey electrical signals other than a transmission signal to be generated by the device; incorporating a ground conductor within the wiring connector, the ground conductor being sized to receive at least a portion of the transmission signal generated by at least one of the antennas; and coupling the ground conductor to an electrical ground of the device, wherein at least the portion of the transmission signal is electrically grounded.

Example 23: The method of example 22, wherein a cross-section of the ground conductor includes a cross-section that is wider than a cross-section of the signal conductors.

Example 24: The method of example 22, wherein the ground conductor has a length that is a multiple of a quarter-wavelength of the transmission signal.

Example 25: The method of example 24, wherein the wiring connector includes an extension stub configured to extend the length of the conductor to the multiple of the quarter-wavelength of the transmission signal.

Example 26: The method of example 22, wherein the wiring connector includes an extension stub configured to extend the length of the conductor to the multiple of the quarter-wavelength of the transmission signal.

Example 27: A method comprising, in a device including transmission circuitry and a plurality of antennas coupled with the transmission circuitry, selecting a conductor within a wiring connector of a supporting circuitry to serve as an isolation element for a transmission signal generated by the device via the antennas; and coupling the conductor to an electrical ground of the device, wherein a portion of the transmission signal received by the ground conductor is electrically grounded.

Conclusion

Although apparatuses for presenting an isolation element, devices incorporating an isolation element, and method for providing an isolation element have been described in language specific to features and/or methods, it is to be understood that the subject of the appended claims is not necessarily limited to the specific features or methods described. Rather, the specific features and methods are disclosed as example implementations enabling of providing an isolation element.

What is claimed is:

1. An apparatus comprising:

supporting circuitry configured to perform non-transmission functions in a device including transmission circuitry coupled with a plurality of antennas configured to transmit a transmission signal;

a conductor incorporated within the supporting circuitry and configured to be coupled to an electrical ground, the conductor configured to receive and ground a portion of the transmission signal from at least one of the antennas; and the device comprising a housing in which the transmission circuitry, the plurality of antennas, and the supporting circuitry are disposed, the housing comprising a first housing and a second housing, and a first section of the supporting circuitry being arranged in the first housing and a second section of the supporting circuitry being arranged in the second housing.

2. The apparatus of claim 1, wherein the supporting circuitry includes a wiring connector including the conductor and a plurality of signal conductors configured to conduct electrical signals other than the transmission signal.

3. The apparatus of claim 2, wherein a cross-section of the conductor is wider than a cross-section of another of the signal conductors.

4. The apparatus of claim 2, wherein the wiring connector includes a flex connector.

5. The apparatus of claim 2, wherein the conductor has a length that is a multiple of a quarter-wavelength of the transmission signal.

6. The apparatus of claim 5, wherein the wiring connector includes an extension stub configured to extend the length of the conductor to the multiple of the quarter-wavelength of the transmission signal.

7. The apparatus of claim 6, wherein the extension stub is disposed at a midpoint of the wiring connector or at an end of the wiring connector.

8. The apparatus of claim 1, wherein:

the supporting circuitry includes a wiring connector including the conductor and a plurality of signal conductors configured to conduct electrical signals other than the transmission signal; and the wiring connector connects the first and second sections.

9. The apparatus of claim 8, wherein, in a joint position of the first and second housings, the conductor of the wiring connector is positioned within a predetermined distance range from each one of the antennas of the plurality of antennas.

10. The apparatus of claim 1, wherein the plurality of antennas is located in the first housing or the second housing; or at least one antenna of the plurality of antennas is located in the first housing and at least one other antenna of the plurality of antennas is located in the second housing.

11. The apparatus of claim 1, further comprising:

a circuit board in the supporting circuitry; and a conductive trace formed on the circuit board, wherein the conductive trace is configured as at least part of the conductor.

12. A method comprising:

coupling supporting circuitry within a device including a plurality of antennas with a wiring connector that includes a plurality of signal conductors configured to convey electrical signals other than a transmission signal to be generated by the device;

incorporating a conductor within the wiring connector, the conductor being sized to receive at least a portion of the transmission signal generated by at least one of the antennas;

coupling the conductor to an electrical ground of the device, wherein the portion of the transmission signal received by the conductor is electrically grounded;

arranging the plurality of antennas and the supporting circuitry in a housing of the device including a first housing and a second housing; and arranging a first section of the supporting circuitry in the first housing and a second section of the supporting circuitry in the second housing.

13. The method of claim 12, wherein the ground conductor has a length that is a multiple of a quarter-wavelength of the transmission signal.

14. The method of claim 13, wherein the wiring connector includes an extension stub configured to extend the length of the conductor to the multiple of the quarter-wavelength of the transmission signal.

15. A device comprising:

transmission circuitry configured to transmit a transmission signal;

a plurality of antennas coupled with the transmission circuitry;

supporting circuitry configured to perform non-transmission functions within the device;

a wiring connector extending between sections of the supporting circuitry, the wiring connector including a conductor coupled to an electrical ground within the device, wherein the conductor is configured to receive and ground a portion of the transmission signal from at least one antenna of the plurality of antennas; and a housing in which the transmission circuitry, the plurality of antennas, and the supporting circuitry are disposed, the housing comprising a first housing and a second housing, and a first section of the supporting circuitry arranged in the first housing and a second section of the supporting circuitry arranged in the second housing.

16. The device of claim 15, wherein the wiring connector includes a plurality of signal conductors configured to conduct electrical signals other than the transmission signal.

17. The device of claim 16, wherein a cross-section of the conductor is wider than a cross-section of a signal conductor of the plurality of signal conductors.

18. The device of claim 15, wherein:

the conductor has a length that is a multiple of a quarter-wavelength of the transmission signal; and the wiring connector includes an extension stub configured to extend the length of the conductor to the multiple of the quarter-wavelength of the transmission signal.

19. The device of claim 18, wherein the extension stub is disposed at a midpoint of the wiring connector or at an end of the wiring connector.

20. The device of claim 15, further comprising:

a circuit board in the supporting circuitry; and a conductive trace formed on the circuit board, wherein the conductive trace is configured as at least part of the conductor.

* * * * *